S. B. Howd
Hydraulic Propeller.

Nº 4,081.      Patented Jun. 14, 1845.

Witnesses
Stephen Cyhu
George W. Scott

Inventor
Samuel B. Howd

UNITED STATES PATENT OFFICE.

SAMUEL B. HOWD, OF ARCADIA, NEW YORK.

IMPROVEMENT IN SUBMERGED PADDLE-WHEELS.

Specification forming part of Letters Patent No. 4,081, dated June 14, 1845.

*To all whom it may concern:*

Be it known that I, SAMUEL B. HOWD, of the town of Arcadia, county of Wayne, and State of New York, have invented a new and Improved Wheel for Propelling Boats; and I do hereby declare that the following is a full and exact description thereof.

The nature of my invention consists in constructing a submerged wheel for propelling boats, so as to give the paddles a compound movement by which they enter into and recede from the water with diminished friction and become inert during that part of the revolution of the wheel when they are out of the field of effective action.

To enable others skilled in the art to use my invention, I will proceed to describe its construction, arrangement, and operation.

I thus construct my wheel: Between two disks of any convenient diameter, of cast-iron or any other suitable material of sufficient strength to resist the power applied to the wheel, are placed five or more paddles of any convenient length. These paddles are shaped like two segments of a cylinder cut off by planes parallel to the axis and joined together on their plane sides. Such paddles are held in their place by being entered at each end in mortises made in arms at right angles to a line in the direction of the arms, which arms at their ends opposite that to which the paddles are attached are connected with shafts passing through the disks upon which the paddles move, and which I call "paddle-shafts." These shafts pass through the disks, and the inner ends thereof are held by a cap fastened to the disk. To find the localities of the paddle-shafts, determine the number and width of the paddles in the wheel, then describe a circle from the center of the disks of such extent that when divided into a number of arcs equal to the number of paddles the length of the cord of the arcs shall be equal to the width of the paddles, and then on the outside of this circle at the distance of the radius thereof take points at such positions as that circles described from them shall cut the extremities of the above-mentioned arcs, and such points will be the centers of the paddle-shafts. On the outer sides of the disks cross-heads are attached to the paddle-shafts in such a position relative to the paddles and of such a length as that the wrists fixed at each end of them shall traverse the oscillators hereinafter described and cause one oscillation of the paddles at every revolution of the wheel.

Without the disks of the wheel in the contiguous sides of the chamber hereinafter mentioned are two, each intersecting the other twice, variable curved grooves, in which the wrists of the cross-heads move, and which I call "oscillators," the direction of which in relation to their several respective parts and to each other is such as to cause the paddles to dip edgewise and remain so while the wheel is performing such a part of a revolution as the number 1 bears to the whole number of paddles in the wheel and then to recede edgewise, so as not to carry water with them in that part of a revolution of the wheel intermediate the time of their recession and that of their again dipping. The direction of these oscillators is also such as to cause the paddles to remain at rest the same length of time they remain dipped at a point diametrically opposite the center of that portion of the wheel which acts upon the water, as by reference to drawings will more fully appear.

Through the center of the wheel a main shaft is passed, at one end of which the wheel is stepped and at the other the power of the engine is applied. Between the disks of the wheel and surrounding the main shaft and attached to it by wings or arms is a cylinder in diameter equal to that of the above-mentioned circle described for the purpose of ascertaining the localities of the paddle-shafts, and is fluted exteriorly with as many flutes as there are paddles in the wheel, the curvature of which is the same as the curvature of the contiguous faces of the paddles.

The wheel is applied to the boat by being placed mostly within it and so as to operate submerged. It should project beyond the side of the boat to an extent nearly equal to the width of the paddles together with the length of the versed sine of an arc of the periphery, which bears that proportion to the whole circumference that the number 1 bears to the whole number of paddles, as by reference to drawings will more fully appear.

That part of the wheel within the boat I inclose in a chamber and pass the main shaft through the top of it and make the joint around the shaft tight by means of a common stuffing-box. Within the chamber, directly opposite the center of that portion of the wheel without the boat and attached to the side of the chamber, a stop is placed of such extent as to close all the space between the main shaft and the side of the chamber, excepting sufficient to allow the passage of the paddles when folded next to the cylinder, as by reference to drawings will more fully appear.

My wheel is described above as being placed in a vertical position; but it may be placed in a horizontal or in an inclined position. The paddles may be made flat and may be caused to protrude and recede by fixing wrists at each end of them and at or near their extreme outer sides or at both their extreme inner and outer sides and causing such wrists to move in a single curved groove or in two concentric curved grooves.

For the purpose of adding to the efficiency of the wheel it may be inclosed in a trunk extending within and without the boat; and in case of such inclosure the chamber above described may be regarded as a part of the trunk. The length of such trunk should be equal to the diameter of the wheel together with about four times the width of a paddle. The middle of the trunk should be placed opposite the main shaft of the wheel, so as to extend equal distances before and behind it. The outer surface of the outward and inner sides of the trunk should be straight. The inner surface of the outward side of the trunk, commencing at each end, is deflected inwardly in a curved direction toward a vertical plane extending from the center of one orifice of the trunk to that of the other and meets the wheel at such points as will cause the wheel to move in a curve such a part of a revolution as the number 1 bears to the whole number of paddles, this curve being bounded by arcs of circles coinciding with the circumference of the wheel, and this surface being deflected for the purpose of forming such curve. The inner surface of the portion of the trunk within the boat is deflected outwardly from the last-mentioned plane in a curved direction and meets the wheel at the extremities of the stop, as by reference to drawings will more fully appear.

Figure 1 in the accompanying drawings is a perspective view of the trunk and a portion of the side and bottom of the boat. A is the trunk. B is the upper side of the chamber inclosing the wheel. $a\,a\,a$ are portions of the side of the boat. $b$ is a portion of the bottom of the boat. $d\,d\,d\,d$ are portions of the top side of the trunk. $f$ is the main shaft of the wheel. $g$ is a stuffing-box around the shaft. $h$ is an orifice of the trunk.

Figure 3:
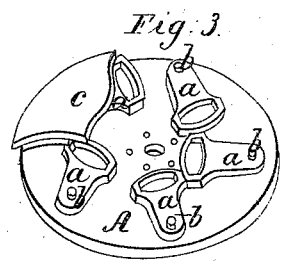
Fig. 3 is a perspective view of the arms, paddle-shafts, and inner side of a disk with all but one of the caps left off. A is a disk. $a\,a\,a$ are arms. $b\,b\,b$ are paddle-shafts. $c$ is a cap.
Figure 1:
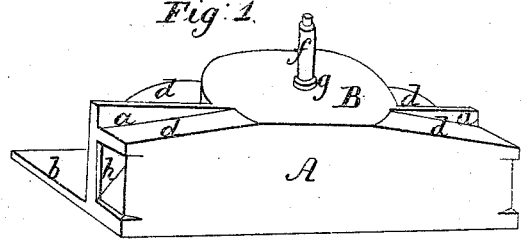
Figure 5:
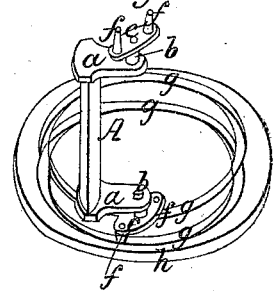
Fig. 5 is a perspective view of an oscillator-wrist, paddle-shafts, cross-heads, arms, and paddles connected. $g\,g\,g\,g$ are grooves or oscillators in which the wrists move. $h$ is the edge of the side of the chamber in which the grooves are made. A is a paddle. $a\,a$ are arms. $b\,b$ are paddle-shafts. $c\,c$ are cross-heads. $f\,f\,f$ are wrists.
Figure 2:
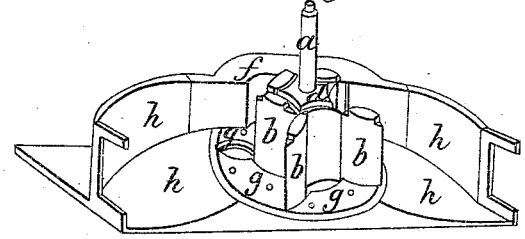
Fig. 2 is a perspective view of the wheel, the inside of the trunk, and the stop. $a$ is the main shaft. $b\,b\,b$ are paddles. $d$ is the fluted cylinder. $f$ is the stop. $g\,g\,g$ are caps bolted to the lower disk. $h\,h\,h$ is the inside of the trunk.
Figure 6:
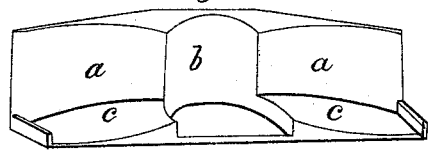
Fig. 6 is a perspective view of the inner surface of the outward side of the trunk with a portion of the bottom attached. $a\,a$ is the deflected inner surface. $b$ is the curve in which the wheel moves. $c\,c$ are portions of the bottom of the trunk.
Figure 7:
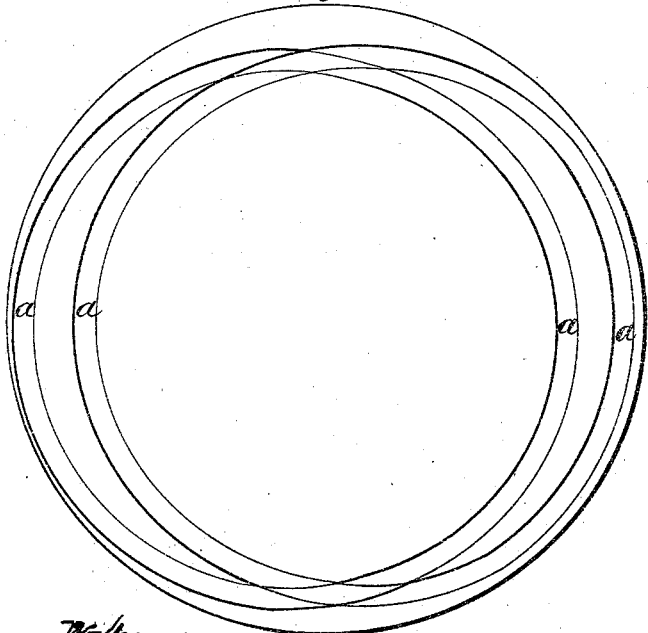
Fig. 7 is a sectional view of an oscillator or the grooves in which the wrists move. $a\,a\,a\,a$ are the grooves.
Figure 4:
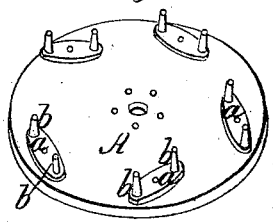
Fig. 4 is a perspective view of the outside of one of the disks, cross-heads, and wrists. A is a disk. $a\,a\,a$ are cross-heads. $b\,b\,b$ are wrists.

What I claim as my invention, and desire to secure by Letters Patent, is—

A mode of constructing a submerged wheel for propelling boats with paddles having a compound motion such as to cause them to enter into and recede from the field of effective action edgewise and when out of the field of effective action to move edgewise inertly from the point of recession to that of dipping, in the form and manner and for the purpose set forth in the foregoing specification.

SAMUEL B. HOWD.

Witnesses:
STEPHEN CULVER,
JOHN COVENTRY.